Sept. 13, 1927.　　　F. W. WOOD　　　1,642,284
THERMOSTATIC CIRCUIT CONTROLLER
Filed Jan. 17, 1923
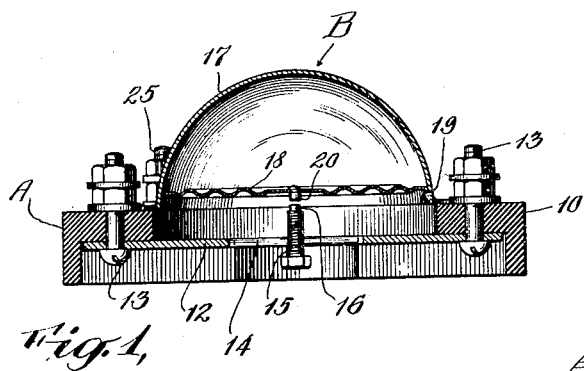
Fig.1,
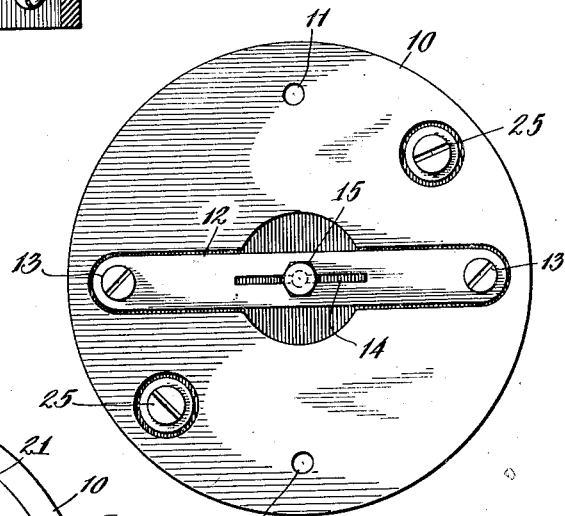
Fig.3,
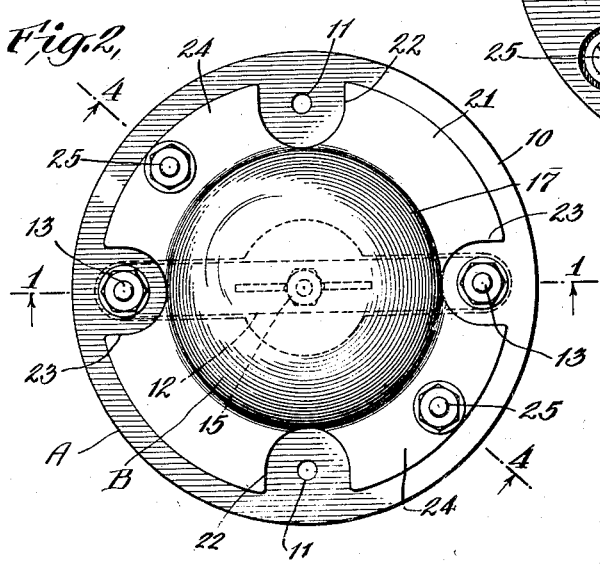
Fig.2,
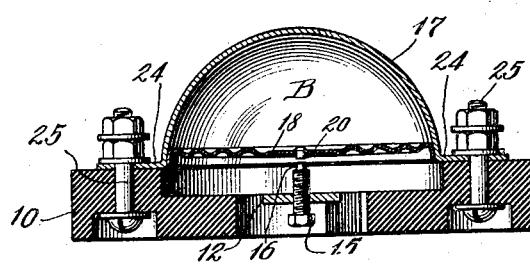
Fig.4,
INVENTOR
FRANK W. WOOD
BY
ATTORNEYS Patented Sept. 13, 1927.

1,642,284

UNITED STATES PATENT OFFICE.

FRANK W. WOOD, OF MONTCLAIR, NEW JERSEY, ASSIGNOR TO CHAS. CORY & SON, INCORPORATED, OF NEW YORK, N. Y., A CORPORATION OF NEW YORK.

THERMOSTATIC CIRCUIT CONTROLLER.

Application filed January 17, 1923. Serial No. 613,141.

This invention relates to a thermostat, and more particularly to a thermostatic circuit controller; and has special reference to the provision of a thermostat circuit controller responsive to sudden changes of atmospheric temperature for electrically controlling fire alarm systems or the like.

One of the prime desiderata of the present invention comprehends the provision of a thermostat circuit controller or relay in which the essential parts are constructed so that they may be handled in units for facilitating assembly in manufacture and affording ease of assembly and disassembly in use for the purpose of conveniently permitting inspection, repair and replacement of parts without causing a disorganization of the thermostatic units.

A further principal desideratum of the present invention includes the provision of a thermostatic circuit controller which is constructed to respond with a great degree of sensitiveness to changes in temperature so as to accurately and rapidly indicate or record the presence of danger, as when the same is employed for operating or controlling fire alarm systems.

To the accomplishment of the foregoing and such other objects as will hereinafter appear, my invention consists in the elements and their relation one to the other, as hereinafter particularly described and sought to be defined in the claims; reference being had to the accompanying drawings which show a preferred embodiment of my invention, and in which:

Fig. 1 is an elevational view of the thermostat circuit controller taken in cross-section on the line 1—1, Figure 2, Fig. 2 is a top plan view thereof, Fig. 3 is a bottom plan view thereof, and Fig. 4 is an elevational view taken in cross-section on the line 4—4, Figure 2.

As heretofore mentioned, a prime desideratum of the present invention comprehends the provision of a thermostat made up of parts which may be manufactured and handled in separate and replaceable units, and which parts may be quickly assembled in the process of manufacture and may be rapidly disassembled without marked disorganization for purposes of adjustment, repair and replacement of parts. To these ends the thermostat circuit controller comprises essentially two units, including a contact carrying base unit generally designated as A, and a contact carrying thermostat bulb unit generally designated as B removably carried by the base unit A.

The base unit A in the preferred construction comprises an annular base member 10 made of an insulating material such as bakelite, hard rubber, fibre or the like, which base member may be mounted on any suitable support by means of securing elements received by the spaced apertures 11 in the base member, the said base member being provided with a metallic strip member 12 arranged interiorly of the same and disposed along a diameter thereof, the said metallic strip member being attached at its opposite ends to the base member by means of the binding posts 13, 13. The metallic strip member 12 is provided with a longitudinal slot 14 arranged centrally thereof, the center of said slot being suitably tapped for the reception of the screw contact element 15 provided with the contact point 16, the said screw contact element being adjustable in the metallic strip 12 for adjustably positioning the contact point 16.

The bulb unit B comprises a wall section 17 and a preferably corrugated diaphragm 18 united thereto providing the marginal joint 19, the said diaphragm 18 carrying centrally thereof, a contact point 20 complemental to the contact point 16, the said contact points forming means for controlling an electrical circuit. The thermostat bulb is removably attachable to the base member 10, and for providing facility of attachment the wall section 17 is provided with marginal flange portions which are adapted to seat over the base member 10 to be secured thereto, the said marginal flange portions comprising in the preferred construction an annular marginal extension 21 oppositely notched as at 22, 22 and at 23, 23 to insulate the bulb member from the binding posts 13, 13 and from the means utilized for securing the base member to a support, the annular extension providing the oppositely disposed flange portions 24, 24 which are secured to the base member by means of the binding posts 25, 25, the said binding posts forming means for removably attaching the bulb unit to the base unit and for electrically connecting the bulb unit and the contact point thereof to a circuit.

With this construction it will be evident that the base and bulb parts after manufacture may be handled as integral units, and that the bulb may be quickly attached to and detached from the base of the thermostat without effecting any disorganization of the parts of either unit. It will be further seen that with the construction provided, the necessity for soldering parts is entirely dispensed with, the binding posts 13 of the base unit providing the means for electrically connecting the contact point 16 to a circuit, and the binding posts 25 besides forming securing means for attaching the bulb to the base of the thermostat provides means for electrically connecting the contact point 20 to such circuit. It will be seen, moreover, that the diaphragm 18 and the contact elements of the controller are suitably housed when the base member is attached to a support, so that the parts are protected in use against injury or damage. Moreover, by the symmetrical construction produced, including the provision of a plurality of sets of binding posts, the thermostat circuit controller may be employed for controlling a number of independent fire alarm or other circuits.

As heretofore mentioned, a further desideratum of the invention comprehends the provision of a construction in which the action of the diaphragm is caused to respond quickly and sensitively to changes in atmospheric temperature and to this end the wall section 17 of the thermostatic bulb B is made preferably hemi-spherical, and the corrugated diaphragm 18 is attached thereto substantially in the plane of a great circle of the said hemi-spherical wall section. With this construction the expansion of air in the bulb B due to an increase in atmospheric temperature will cause a correspondingly large deflection of the diaphragm and a considerable movement of the diaphragm contact element 20.

The manner of making, assembling and using my thermostat circuit controller will in the main be apparent from the above detailed description thereof. It will be further apparent that this thermostat is subject to simplicity of manufacturing operations and is constructed of a very few parts, and is so designed that the complemental contact elements are carried by separable units which may be quickly assembled during manufacture, and handled with great convenience and economy in practice. Moreover, the operating parts are rigidly constructed and protectively housed in the normal use thereof, the circuit controller having been found to respond with considerable accuracy and with a high degree of sensitiveness in operation.

While I have shown my invention in the preferred form, it will be obvious that many changes and modifications may be made in the structure disclosed without departing from the spirit of the invention, defined in the following claims.

I claim:

1. A thermostatic circuit controller, including base and bulb units, the bulb unit comprising a substantially hemi-spherical cover element having a marginal flange resting upon the base, and a diaphragm arranged transversely of the cover and spaced from the base when the flange engages the base, the diaphragm carrying a central contact member, a second contact member carried by the base, binding posts providing circuit connections for the contact members, the posts for the circuit connections of the bulb unit contact member passing through the flange and connecting the cover to the base, and all of said posts being within the periphery of the flange.

2. A thermostatic circuit controller, including base and bulb units, the bulb unit comprising a substantially hemi-spherical cover element having a marginal flange resting upon the base, and a diaphragm arranged transversely of the cover and spaced from the base when the flange engages the base, the diaphragm carrying a central contact member, a second contact member carried by the base, binding posts providing circuit connections for the contact members, the posts for the circuit connections of the bulb unit contact member passing through the flange and connecting the cover to the base, all of said posts being within the periphery of the flange, the base having a central opening, and a metallic strip member held by the base transversely of the opening, the contact member of the base having threaded engagement with said strip member.

Signed at New York city in the county of New York and State of New York, this 11th day of January, A. D. 1923.

FRANK W. WOOD.